United States Patent [19]

Yajima

[11] Patent Number: 4,465,959
[45] Date of Patent: Aug. 14, 1984

[54] STEP MOTOR DRIVE CONTROL

[75] Inventor: Torao Yajima, Shiojiri, Japan

[73] Assignees: Epson Corporation, Nagano; Kabushiki Kaisha Suwa Seikosha, Tokyo, both of Japan

[21] Appl. No.: 400,177

[22] Filed: Jul. 20, 1982

[30] Foreign Application Priority Data

| Jul. 21, 1981 | [JP] | Japan | 56-114199 |
| Dec. 22, 1981 | [JP] | Japan | 56-207376 |
| Apr. 9, 1982 | [JP] | Japan | 57-59324 |
| Apr. 9, 1982 | [JP] | Japan | 57-59325 |

[51] Int. Cl.$^3$ .......................................... H02K 29/04
[52] U.S. Cl. ...................................... 318/696; 318/685
[58] Field of Search ................................. 318/685, 696

[56] References Cited

U.S. PATENT DOCUMENTS 3,660,746  5/1972  Milek ..................................... 318/696

FOREIGN PATENT DOCUMENTS 1388017  3/1975  United Kingdom .
1427296  3/1976  United Kingdom .
2016225  2/1979  United Kingdom .

OTHER PUBLICATIONS

Benjamin C. Cuo, Step Motors and Control Systems, 1979, pp. 234-255.

Primary Examiner—B. Dobeck
Assistant Examiner—Saul M. Bergmann
Attorney, Agent, or Firm—Blum, Kaplan, Friedman, Silberman & Beran

[57] ABSTRACT

A drive control system for a step motor. The system includes a detector for detecting when the step motor is central between step positions of the step motor and for producing a timing signal representative of the central position of the step motor. Motor drive coils selectively driven by a drive control circuit actuate the step motor. The drive control circuit receives the timing signal and in response thereto selectively actuates the motor drive coils to allow the step motor to stop at its next step position.

27 Claims, 7 Drawing Figures

STEP MOTOR DRIVE CONTROL

BACKGROUND OF THE INVENTION

This invention is directed to a step motor drive control system and, in particular, to a closed loop driving arrangement for driving a step motor in incremental steps.

In general, closed loop control of step motors is a preferred method for single-step driving of step motors. This is due to the fact that open loop control of step motors cannot detect the angular position of the rotor of the step motor or the speed and acceleration of the step motor. Two basic types of systems for driving step motors are available. In the first type of driving system, the driving system first actuates certain phases (as used herein, the term "phase" refers to the manner in which the coil or coils of the step motor are actuated to effect driving) to drive the step motor, deactuates the phases upon elapse of a predetermined interval of time, and then reactuates the phases which were first actuated upon elapse of another predetermined interval of time. In the second type of driving system, the driving system drives the step motor in micro-steps by changing the ratio of a current in each phase in order to subdivide each step of the motor into micro-steps for controlling the motor with a resolving power of such micro-steps. The second type of driving system is utilized where coils of two or more phases are actuated as with two-two phase excitation of a step motor.

According to the first drive system described above, the time intervals for actuation and deactuation are predetermined by way of experimentation to thereby determine a sequence of actuation times. When the step motor is subjected to load variations and varying power supply voltages, the motor tends to vibrate greatly and undergo step-out thereby failing to achieve good step response characteristics. Such a system is also disadvantageous in that the force with which the motor can be braked for deceleration is mostly a frictional force load imposed on the motor and, hence, is small, resulting in an increased period of time required to decelerate the motor. This is a closed loop system. A closed loop speed control system for step motors used to drive print heads of printing devices is disclosed in U.S. patent application Ser. No. 06/244,936, filed Mar. 18, 1981 and assigned to the same assignees as the present application.

According to the second driving system referred to above, open loop drive control of the step motor is achieved. However, with one step of a step motor being divided into smaller substeps for controlling the step motor with a resolving power of such substeps, the vibrations caused due to motor load variations and voltage differences are more reduced the greater the resolving power of the steps become. Such a system, although having good step response characteristics, is nevertheless disadvantageous in that there are required as many circuits for changing the current flowing through the phase coils, respectively, of the step motor by the steps of the resolving power for the motor as there are phases, and hence the overall circuit is complex and quite costly. The present invention has been designed in an effort to eliminate the difficulties described above. Accordingly, a step motor drive control which accurately drives a step motor with excellent single-step response is desired.

SUMMARY OF THE INVENTION

Generally speaking, in accordance with the present invention, a step motor drive control system for controlling the step drive of a step motor is provided. The system includes a motor drive for actuating the step motor to incrementally advance the step motor from a first step position to a second step position. A detector detects when the step motor has been advanced from the first step position towards the second step position and produces a timing signal representative of the central position of the step motor. A drive control circuit selectively actuates the motor drive and is adapted to receive the timing signal and in response thereto selectively actuate the motor drive to stop the step motor at the second step position.

Accordingly, it is an object of the present invention to provide an improved drive control for step motors.

Another object of the present invention is to provide a drive system for a step motor with excellent single-step response.

A further object of the present invention is to provide a step motor drive control wherein vibration of the step motor during acceleration, deceleration and stopping is substantially prevented.

Still a further object of the invention is to provide a step motor drive control which requires the use of only one position detector regardless of the direction of rotation of the step motor.

Still other objects and advantages of the invention will in part be obvious and will in part be apparent from the specification.

The invention accordingly comprises the features of construction, combination of elements and arrangement of parts which will be exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
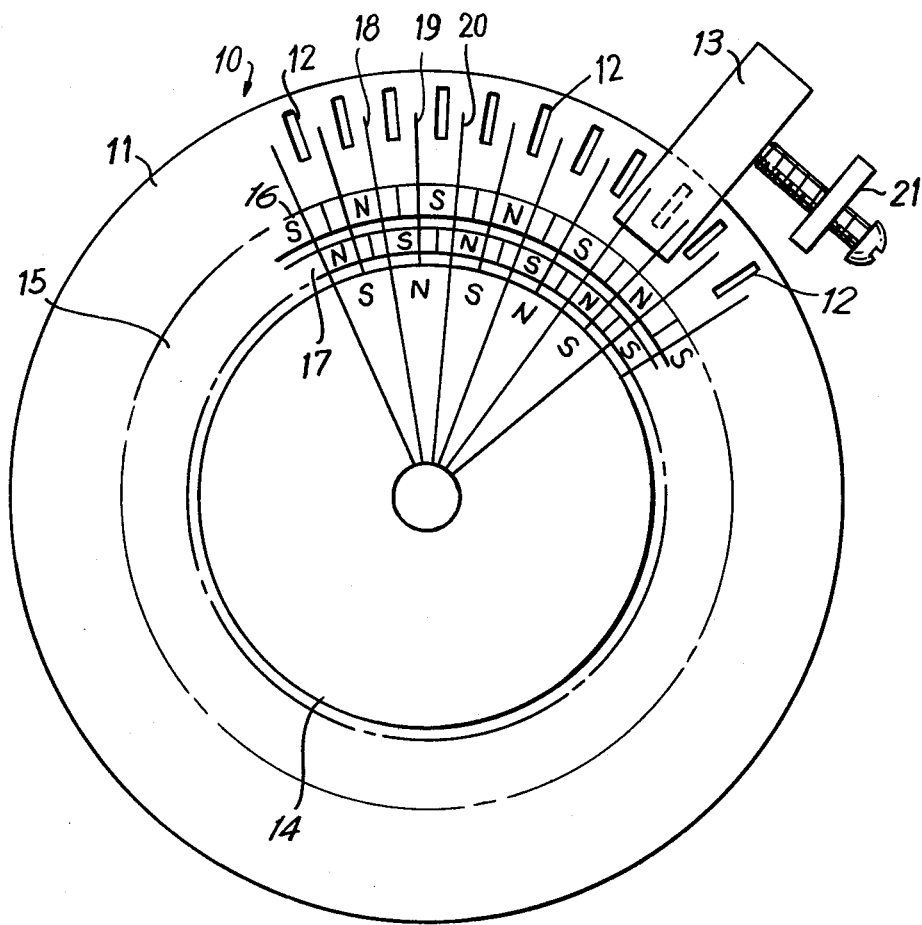
FIG. 1 is an enlarged view showing the phase relationships between a position detector, and a rotor and stator of a step motor in a step motor drive control system constructed in accordance with the invention.

Referring first to FIG. 1, a step motor, generally indicated at 10, having a rotor 14 and a stator 15 is depicted. FIG. 1 will be utilized to describe the phase relationships between a position detector 13 and rotor 14 and stator 15 of step motor 10. Step motor 10 is a four-phase permanent magnet (PM) step motor. Phases of stator 15 are indicated at 16 and 17. Several detent positions of step motor 10 are indicated by lines at 18, 19 and 20.

As depicted, detector 13 is an optical position detector which is adjusted into proper position by a phase adjuster 21 in order detect the positions of apertures or slits 12 circumferentially provided in a timing disc 11. Detector 13 produces a detection or timing signal, as described in detail below, at a central position or central point between detent or step positions of step motor 10.

Figure 2:
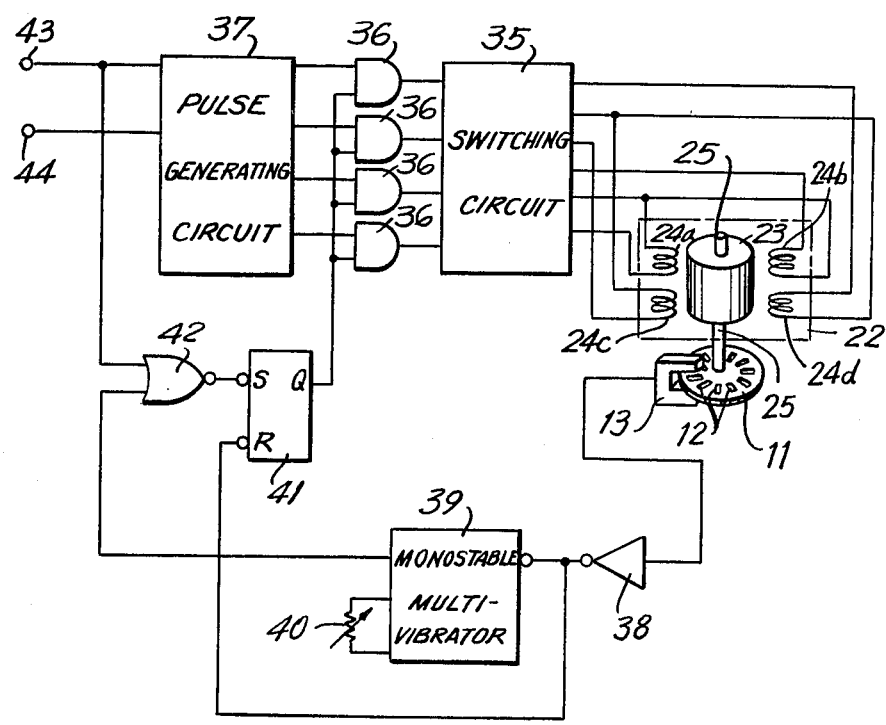
FIGS. 2, 3 and 4 are block diagrams illustrating alternate embodiments of drive control systems constructed in accordance with the present invention for use in driving step motors wherein the circuits depicted are capable of deactuating the step motor coils when a timing pulse is produced.

Reference is now made to FIG. 2 which depicts one embodiment of a drive circuit for the step motor drive control system according to the present invention. A step motor 22 includes a rotor 23 and stator coils 24a, 24b, 24c and 24d. Timing disc 11 is fixed to drive shaft 25 of step motor 22. Timing disc 11 includes a plurality of radially extending slits 12. The position of a slit 12 in registration with detector 13 is detected by optical position detector 13.

The circuit of FIG. 2 includes a power supply switching circuit 35 for selectively energizing or actuating coils 24a through 24d of step motor 22, AND gates 36, a pulse generating circuit 37 for generating pulses or signals for driving the phases of the coils of step motor 22, a waveform shaping circuit 38 for shaping the timing signals produced by detector 13, a monostable multivibrator 39, a variable resistor 40 for changing the width of the pulses or signals generated by monostable multivibrator 39, an R-S flip-flop 41, a NOR gate 42, an input terminal 43 for a starting pulse or signal for step motor 22 and an input terminal 44 for a signal indicative of the direction of rotation of step motor 22.

When a single pulse or signal is applied to input terminal 43 with a status signal of a logic level of "HIGH" or "LOW" being supplied to input terminal 44 to determine direction of rotation, pulse generating circuit 37 generates phase coil driving pulses for actuating coils 24a through 24d which acts to displace rotor 23 of step motor 22 to an adjoining detent or step position, dependent on the indicated direction of rotation of step motor 22 determined by the signal applied to input terminal 44. With the starting pulse applied, R-S flip-flop 41 has an output of "HIGH" level, and, hence, the AND gates 36 are actuated, allowing switching circuit 35 to actuate coils 24a through 24d of step motor 22 for moving rotor 23 to an adjoining detent or step position. Timing disc 11 connected directly to motor shaft 25 and position detector 13 which detects the position of slits 12 angularly spaced around disc 11 at positions that are equal to the step angles of step motor 22, are adjusted such that position detector 13 will generate a timing pulse or signal when it is disposed at a central position between adjacent step positions of step motor 22.

When step motor 22 is caused to rotate and position detector 13 produces a timing pulse or signal, the output of R-S flip-flop 41 goes "LOW", causing the AND gates 36 to be turned off. Step motor 22 is thus deactuated. Rotor 23 which had been accelerated now starts to decelerate. When the timing pulse is produced by detector 13, monostable multivibrator 39 is energized. A control pulse is generated by monostable multivibrator 39 at a predetermined time after the timing signal has been generated. Such a pulse causes R-S flip-flop 41 to produce an output of "HIGH" level, whereupon the AND gates 36 are turned on again. The coils 24a through 24d of step motor 22 are reactuated in the same manner and phase as described above before they were deactuated.

Rotor 23 which has been decelerated and approaches the next step position is locked in this step position when motor coils 24a through 24d are reactuated in the same phase. Rotor 23 can be stopped in such a position without being subjected to vibrations by adjusting the time set in monostable multivibrator 39 such that rotor 23 will have a speed of zero when it reaches the next detent or step position. Since a timing pulse or signal is produced by detector 13 when rotor 23 is located at a central position between adjacent detent or step positions, rotor 23 can be stopped in the next step position irrespective of whether motor 22 rotates clockwise or counterclockwise. Accordingly, by detecting when rotor 23 is at a central position between step positions and producing a timing signal in response thereto, step motor 22 can be accurately stopped at the next step position.

Figure 3:
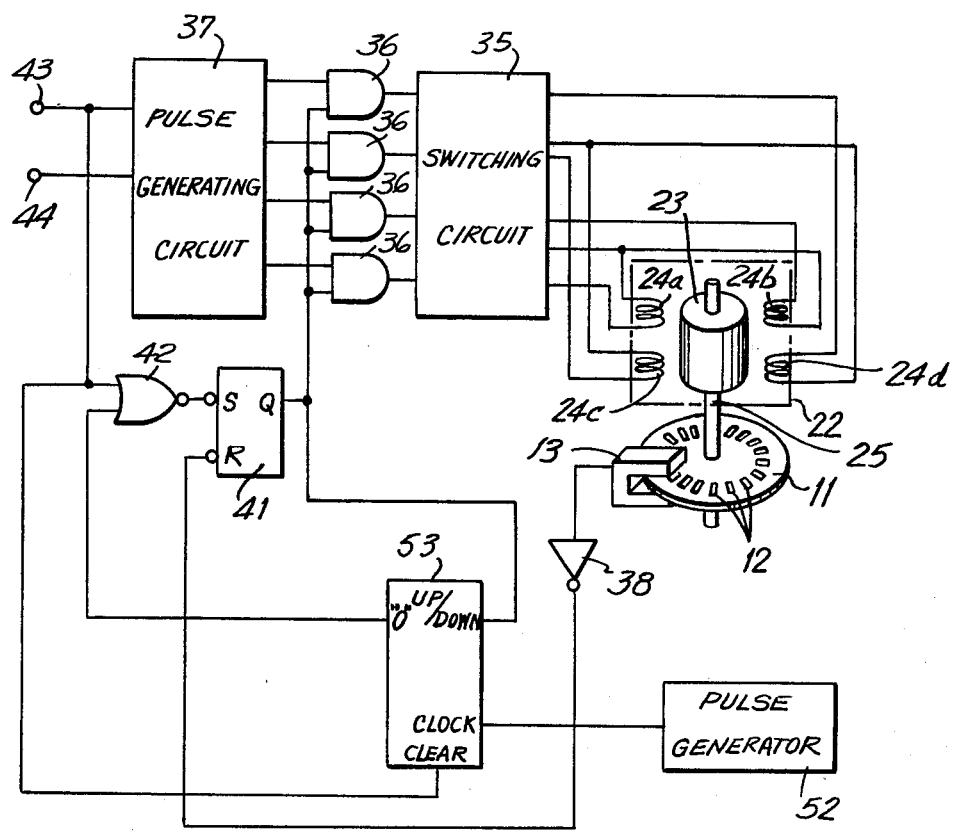

Referring now to FIG. 3, an alternate embodiment of a drive control system for driving a step motor according to the present invention will be described. Like parts in the circuit of FIG. 3 to parts in the circuit of FIG. 2 are identified by like reference numerals. In FIG. 3, instead of utilizing the monostable multivibrator 39 depicted in FIG. 2, the circuit in FIG. 3 includes a pulse generator 52 and an up-down counter 53.

When rotor 23 of step motor 22 is caused to begin rotation in the same manner as described above with reference to FIG. 2, up-down counter 53 which is cleared by the starting pulses applied to terminals 43 and 44 starts counting up pulses. Clock pulses are supplied from pulse generator 52 to up-down counter 53 which are counted. When position detector 13 generates a timing signal by the passing of a slit 12 therebetween, the output of R-S flip-flop 41 goes "LOW" and hence the AND gates 36 are turned off, thereby deactuating step motor 22. Rotor 23 of motor 22 which had been accelerated starts to decelerate. At the same time, up-down counter 53 starts counting down pulses. When the count output from up-down counter 33 falls to zero (immediately upon the lapse of a time interval equal to the period of time from application of the starting pulse to generation of the timing signal), the output of R-S flip-flop 41 goes "HIGH" again. Motor coils 24a through 24d are reactuated in the same manner and phase as before being deactuated. Rotor 23 which has approached the next step position upon deceleration is locked in such a next step position without being vibrated because of deactuation of motor coils 24a through 24d.

The operation of rotor 23 holds true irrespective of whether step motor 22 rotates clockwise or counterclockwise, since a timing signal is produced by detector 13 when rotor 23 is located at a central position between adjacent step positions. When the power supply voltage to step motor 22 fluctuates and step motor 22 undergoes varying inertia loads and frictional loads, a timing pulse is produced at the time of starting to drive step motor 22 and the period of time which elapses before rotor 23 arrives at the next detent position varies to a great extent. With the drive control system depicted in FIG. 3, however, step motor 22 can be driven at increments of single steps without undergoing vibration because of automatic adjustment of the deceleration time intervals under all operating conditions. Accordingly, the drive control circuit of FIG. 3 is very advantageous in driving a step motor through single steps. It is noted that in the circuit of FIG. 3, the period of pulses generated by pulse generator 52 can be changed to achieve optimum single-step drive for frictional motor loads while the up-down counter 53 is counting either up or down.

Figure 4:
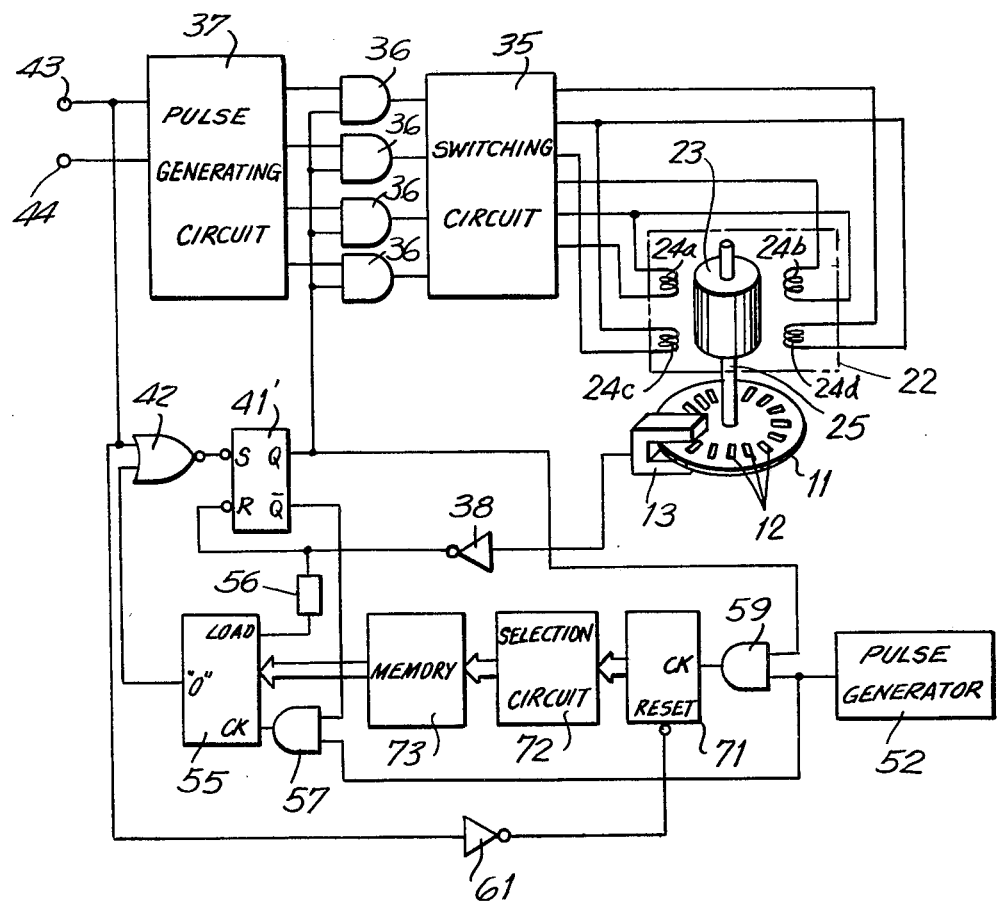

Referring now to FIG. 4, another alternate embodiment of a drive control system for driving a step motor according to the present invention will be described. Like reference numerals for like parts in FIGS. 2 and 3 are utilized in FIG. 4. The circuit of FIG. 4 includes a down counter 55 having parallel inputs, a timing-pulse delaying circuit 56 for supplying parallel inputs to down counter 55, AND gates 57 and 59, an inverter 61, an up counter 71, a selection circuit 72 for selecting a memory address out of acceleration time data in order to derive deceleration time data therefrom and a memory 73 for storing data on deceleration times. An R-S flip-flop 41' includes another terminal $\overline{Q}$.

When step motor 22 is caused to rotate in the manner described above with reference to FIG. 2, and position detector 13 issues a timing signal, the output Q of the R-S flip-flop 41' goes "LOW" whereupon the up counter 71 stops counting. At this time, the AND gates 36 are closed to deactuate the phase coils 24a through 24d of step motor 22. An output from the up counter 71 is fed into selection circuit 72 for selecting a memory address in memory 73 out of the acceleration time data. Memory 73 contains data on deceleration time periods which have been measured in advance with respect to predetermined acceleration times for motor 22.

Selection circuit 72 designates a memory address in memory 73 in which is stored deceleration time data which corresponds to the acceleration time data. Memory 73 thus delivers the deceleration time data, which is set in down counter 55, by a pulse which is formed by delaying the timing signal in delay circuit 56. Down counter 55 starts counting down with a count clock signal which is supplied by pulse generator 52 through AND gate 57 only when the output Q of the R-S flip-flop 41' is "LOW". During such countdown, motor 22 is decelerated.

When the count output from down counter 55 falls to zero, that is, when the deceleration time is over, the output Q of the R-S flip-flop 41' goes "HIGH" again to open the AND gates 36. Motor coils 24a through 24d are reactuated in the same manner and phase as before they are deactuated. Rotor 23 which arrives at the next detent or step position as it is decelerated is locked in that detent position. Rotor 23 can be stopped without any vibration by setting the deceleration time with respect to the acceleration time such that the speed of rotation of rotor 23 become zero when rotor 23 reaches the next detent position. Step motor 22 operates in the same way irrespective of whether it rotates clockwise or counterclockwise since a timing pulse or signal is produced by detector 13 when rotor 23 is located at a central position between adjacent detent positions. With the circuit arrangement depicted in FIG. 4, the time intervals of acceleration and deceleration are in optimum relationship which has been determined in advance, so that step motor 22 can be driven at increments of single steps without vibration.

The foregoing embodiments described above with reference to FIGS. 2, 3 and 4 of the present invention are of the type in which coils 24a through 24d are actuated and deactuated. Since the rotor position, speed and acceleration can be detected, these quantities can be fed back to the circuit for excellent damping characteristics irrespective of variations in the motor load and power supply voltage.

Figure 5:
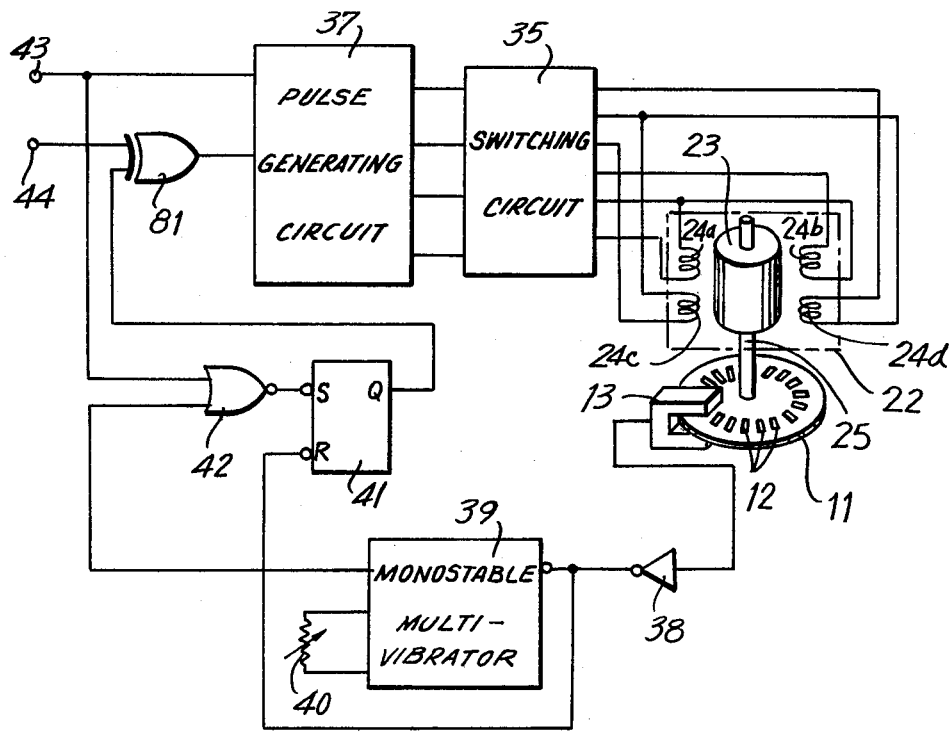
FIGS. 5, 6 and 7 are block diagrams of drive control systems constructed in accordance with other alternate embodiments of the present invention for use in driving step motors, each circuit being capable of switching to a mode of actuation in opposite phase of the step motor coils when a timing pulse is produced.
Figure 6:
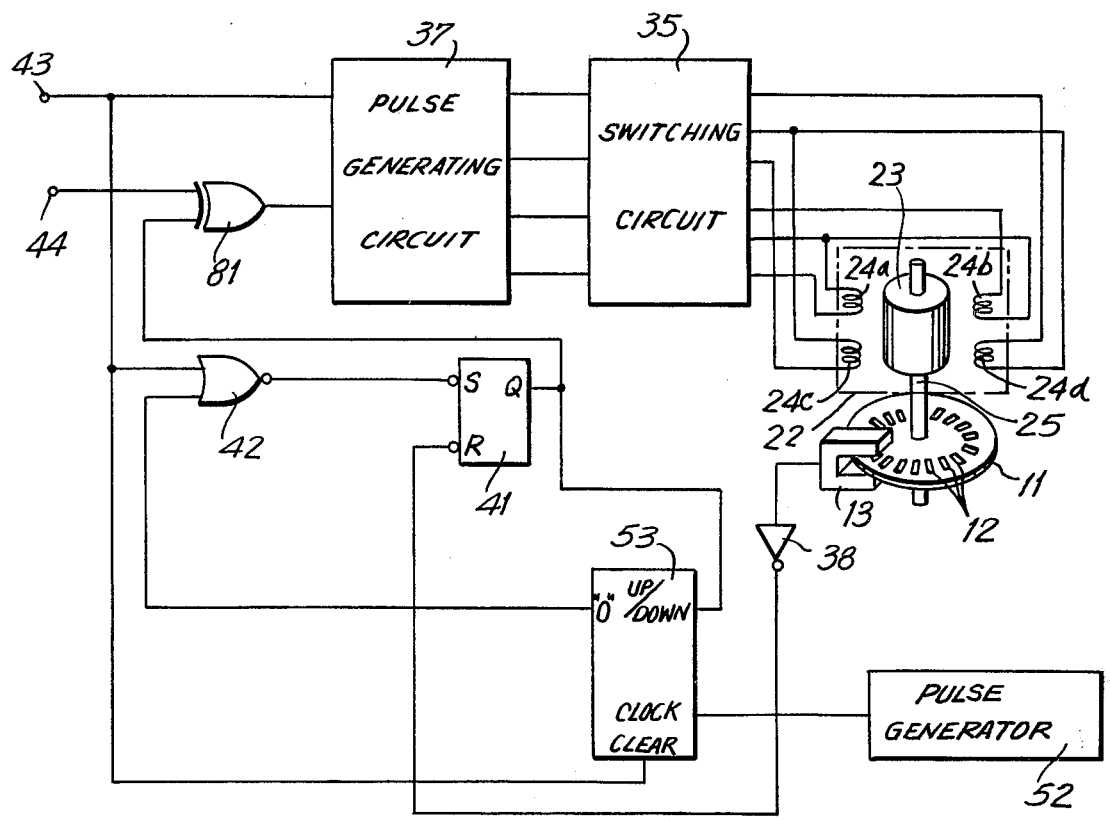
Figure 7:
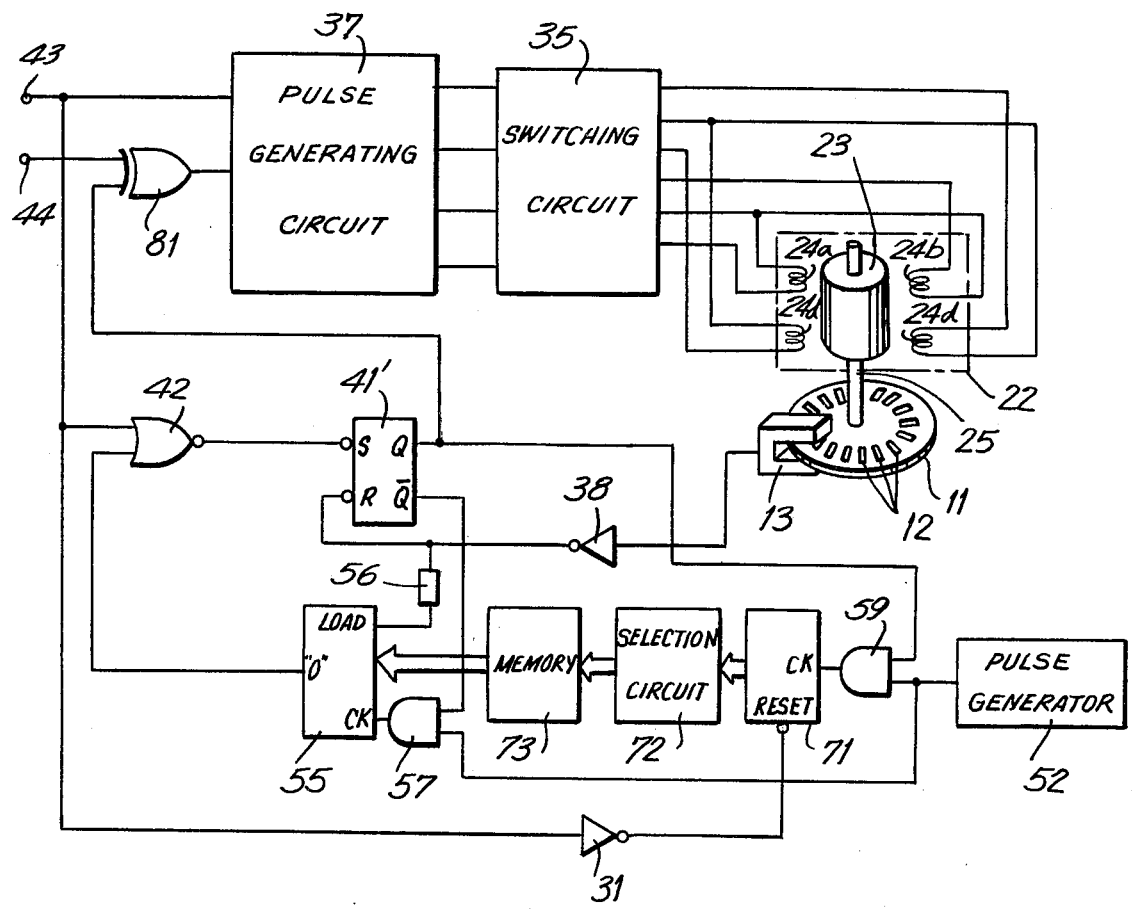

FIGS. 5, 6 and 7 depict other alternate embodiments of drive control system for use in driving step motors in accordance with the present invention. The circuits depicted in FIGS. 5, 6 and 7 are similarly constructed to the circuits depicted in FIGS. 2, 3 and 4, respectively. However, the circuits in FIGS. 5, 6 and 7 differ from those in FIGS. 2, 3 and 4, respectively, in that although in the circuits of FIGS. 2, 3 and 4 motor coils 24a through 24d are deactuated when a timing signal from position detector 13 is produced, in the circuits of FIGS. 5, 6 and 7, coils 24a through 24d are actuated in opposite phase to rotate step motor 22 in an opposite direction to force deceleration when a timing signal is generated by position detector 13.

TABLE 1 below indicates conditions 1, 2, 3 and 4 of energization coils 24a, 24b, 24c and 24d. As indicated in TABLE 1, the condition of energization (phase) changes from 1 to 2 to 3 to 4 during an ordinary mode of energization. With energization in opposite phase, each coil will be actuated or deactuated in conformity with one condition ahead of the current condition in which the coil is actuated or deactuated. For example, the condition may change from 1 to 2 to 3 to 2.

TABLE 1

| phase | condition | | | |
|---|---|---|---|---|
| | 1 | 2 | 3 | 4 |
| 24a | ON | ON | OFF | OFF |
| 24b | OFF | OFF | ON | ON |
| 24c | ON | OFF | OFF | ON |
| 24d | OFF | ON | ON | OFF |

In the circuits depicted in FIGS. 5, 6 and 7, an EXCLUSIVE-OR gate 81 (hereinafter referred to as "EOR" gate) is provided. The drive circuit depicted in FIG. 5 will now be described. When a signal starting pulse is applied to starting pulse input terminal 43 with a status signal "HIGH" or "LOW" level supplied to direction signal input terminal 44, pulse generating circuit 37 produces coil driving pulses for actuating the coils to displace rotor 23 to an adjoining detent or step position dependent on the direction of rotation which is designated by pulse generating circuit 37 and selected by the signal applied to terminal 44.

With the starting pulse applied, the output Q of the R-S flip-flop 41 is "HIGH", allowing the EOR gate 81 to produce an output which is representative of the direction of rotation of rotor 23 as it is supplied from input terminal 44. The coils 24a through 24d of step motor 22 are actuated by switching circuit 35 to move rotor 23 to an adjoining detent or step position. A timing signal is produced by detector 13 when rotor 23 is located at a central position between adjacent detent positions. When position detector 13 generates such a timing signal upon rotation of step motor 22, the output Q of the R-S flip-flop 41 goes "LOW", and the output of the EOR gate 81 is reversed, whereupon motor coils 24a through 24d are actuated in opposite phase for rotating the step motor 22 in an opposite direction to force deceleration. Rotor 23 which had been accelerated begins to decelerate.

When the timing signal is produced by detector 13, monostable multivibrator 39 is energized and will generate an output pulse upon elapse of an interval of time determined in advance and set in monostable multivibrator 39 after the timing signal has been produced and supplied thereto. With the pulse supplied from monostable multivibrator 39 to the R-S flip-flop 41, the output thereof goes "HIGH" again. The output of the EOR gate 81 is reversed again, thus reactuating motor coils 24a through 24d in the same manner and phase as when initially actuated. This operation causes rotor 23 which has been brought into the vicinity of the next detent position during deceleration to be effectively locked at that next detent position. The time set in monostable multivibrator 39 can be adjusted such that the rotor speed is zero when rotor 23 reaches the next detent position thereby stopping rotor 23 without vibration in the same manner as described above with reference to FIG. 2.

The circuit of FIG. 5 having been described in detail as to the differences therebetween with the circuit depicted in FIG. 2, a detailed description of the circuits in FIGS. 6 and 7 is unnecessary since they correspond in a similar manner to the circuits depicted and described above with reference to FIGS. 3 and 4 and can be readily understood from the above descriptions by a person having ordinary skill in the art when considered in conjunction with the circuits of FIGS. 3 and 4 and the description thereof and the description of the differences between FIGS. 2 and 5.

The drive control circuit embodiment depicted in FIGS. 5 through 7 are of the type in which the motor coils 24a through 24d are energizable in opposite phase whereas the circuits shown in FIGS. 2 through 4 energize and de-energize the motor coils, where rotor 23 may tend to overshoot slightly a step position in which rotor 23 is to be stopped. However, with motor coils 24a through 24d energizable in opposite phase as in the circuits of FIGS. 5 through 7, rotor 23 can be more precisely stopped in a desired position. Thus, a motor with excellent damping characteristics can be constructed.

According to the present invention, only one position detector suffices in the circuit to detect the rotation of the rotor in either clockwise or counterclockwise direction under the same mode of control. Such a position detector is advantageous in that it allows circuits and control software to be shared in use. Such a system having a single position detector is more advantageous than open-loop systems with no detector at all or a system having separate detectors for detecting opposite directions of rotation of the rotor which has heretofore been required. Moreover, by detecting the position of the rotor when between detent positions, accurate deceleration and stopping of the rotor at the next detent position, when rotating in either direction, can be achieved without the vibration which normally accompanies the rotation of a step motor.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A drive control system for a step motor comprising motor driving means for actuating said step motor to advance said step motor from a first step position to a second step position, detector means for detecting when said step motor has been advanced from said first step position towards said second step position, said detector means detecting the advance of said step motor when located at a substantially central position between said first and second step positions and producing a timing signal representative of the central position of said step motor, and drive control circuit means for selectively actuating said motor driving means in a first phase to advance said step motor from said first step position, said timing signal being applied to said drive control circuit means, said drive control circuit means deactuating said motor driving means in a predetermined time interval when said timing signal is applied thereto, said drive control circuit means reactuating said motor driving means in said first phase after the passage of said predetermined time interal, whereby said step motor is stopped and held in said second step position.

2. A drive control system for a step motor comprising motor driving means for actuating said step motor to advance said step motor from a first step position to a second step position, drive control circuit means for actuating said motor driving means in a first phase to advance said step motor from said first step position towards said second step position, detector means for detecting when said step motor has been advanced from said first step position towards said second step position, said detector means detecting the advance of said step motor when located at a central position between said first and second step positions, said detector means producing a timing signal representative of the central position of said step motor and applying said timing signal to said drive control circuit means, said drive control circuit means actuating said motor drive means in a second phase in a predetermined time interval when said timing signal is applied thereto, said drive control circuit means reactuating said motor driving means in said first phase after the passage of said predetermined time interval whereby said step motor is stopped and held in said second step position.

3. The drive control system as claimed in claims 1 or 2 wherein said step motor is adapted to be actuated in first and second directions, said detector means detecting the advance of said step motor in both said first and second directions.

4. The drive control system as claimed in claim 3, wherein said motor driving means includes stator coil means, said step motor including a rotor means adapted to rotate in said first and second directions, said stator coil means selectively actuating said rotor means to rotate in one of said first and second directions.

5. The drive control system as claimed in claim 3, wherein said detector means includes a disc member mounted for rotation by said step motor and formed with circumferentially spaced apertures therethrough and an optical detector in registration with said apertures for detecting the presence of each said aperture as said disc member is rotated.

6. The drive control system as claimed in claim 5, wherein the registration of one of said apertures with said optical detector causes said detector means to produce said timing signal when said step motor is central between said first and second step positons.

7. The drive control system as claimed in claim 1, wherein said drive control circuit means includes timer means, said timing signal being applied to said timer means, said timer means measuring the passage of a time period after the application of said timing signal and producing a control signal in response thereto, said control signal being applied to said drive control circuit means and in response thereto said drive control circuit means reactuating said motor driving means in said first phase to stop said step motor in said second step position.

8. The drive control system as claimed in claim 7, wherein said timer means includes a multivibrator means for measuring the passage of said time period and for producing said control signal after the passage of said time period.

9. The drive control system as claimed in claim 8, wherein said drive control circuit means further includes flip-flop means for selectively actuating said motor driving means in response to the application of said control signal.

10. The drive control system as claimed in claims 1 or 2, wherein said drive control circuit means includes timer means for measuring the passage of a time interval after said motor driving means is initially actuated and before said detector means produces said timing signal, said drive control circuit means reactuating said motor driving means in said first phase upon passage of a time interval which bears a functional relationship to the interval of time measured by said timer means.

11. The drive control system as claimed in claim 10, wherein said timer means includes pulse generator means for producing clock pulses and counter means for counting said clock pulses from initial actuation of said motor driving means.

12. The drive control system as claimed in claim 11, wherein said counter means is an up-down counter means, said up-down counter means counting up said clock pulses supplied by said pulse generator means from initial actuation of said motor driving means to the time when said detector means produces said timing signal, said up-down counter means counting down said clock pulses when said timing signal is produced, said up-down counter means producing a control signal when said up-down counter means counts down the same number of clock pulses as it counted up, said control signal being applied to said drive control circuit means and in response thereto said drive control circuit means reactuating said motor driving means in said first phase to stop said step motor in said second step position.

13. The drive control system as claimed in claim 12, wherein said drive control circuit means includes flip-flop means for selectively actuating said motor driving means in response to said control signal.

14. The drive control system as claimed in claim 1 or 2, wherein said drive control circuit means includes timer means for measuring the time of acceleration of said step motor from initial actuation of said motor driving means to the production of said timing signal by said detector means, memory means for storing predetermined data on relationships between times of acceleration and deceleration of said step motor, selector means for selecting between said data to determine an optimum deceleration time interval for the time of acceleration measured by said timer means, said drive control circuit means deactuating said motor drive means for the optimum deceleration time interval selected by said selector means.

15. The drive control system as claimed in claim 14, wherein said drive control circuit means reactuates said motor drive means in said first phase after the passage of said deceleration time interval.

16. The drive control system as claimed in claim 15, wherein said drive control circuit means includes gate means for actuating said motor drive means.

17. The drive control system as claimed in claim 16, wherein said timer means includes pulse generator means for producing clock signals and counter means for counting said clock signals from initial actuation of said motor drive means to production of said timing signal by said detector means to measure said time of acceleration.

18. The drive control system as claimed in claim 2, wherein said drive control circuit means includes timer means, said timing signal being applied to said timer means, said timer means measuring the passage of a time period after the application of said timing signal and producing a control signal in response thereto, said control signal being applied to said drive control circuit means and in response thereto said drive control circuit means reactuating said motor driving means in said first phase to stop said step motor in said second step position.

19. The drive control system as claimed in claim 18, wherein said timer means includes a multivibrator means for measuring the passage of said time period and for producing said control signal after the passage of said time period.

20. The drive control system as claimed in claim 19, wherein said drive control circuit means includes flip-flop means for selectively actuating said motor driving means in response to said control signal.

21. The drive control system as claimed in claims 1 or 2, wherein said drive control circuit means includes switching means for selectively switching the phase of said motor driving means between said first and second phases.

22. The drive control system as claimed in claim 21, wherein said switching means is an exclusive-or gate.

23. The drive control system as claimed in claim 2 wherein said drive control circuit means includes timer means for measuring the passage of a time interval between initial actuation of said motor driving means in a first phase and production of said timing signal by said detector means, said drive control circuit means actuating said motor driving means in a second phase opposite to that of the first phase to decelerate said step motor when said timing signal is produced, said drive control circuit means reactuating said motor driving means in said first phase upon passage of a time interval which bears a functional relationship to the time interval measured by said timer means.

24. The drive control system as claimed in claim 23, wherein said timer means includes up-down counter means and pulse generator means, said pulse generator means producing clock signals, said clock signals being provided to said up-down counter means so that said up-down counter means can measure said interval.

25. The drive control system as claimed in claim 2 wherein said drive control circuit means includes timer means for measuring the time of acceleration of said step motor from initial actuation of said motor driving means in a first phase to the production of said timing signal by said detector means, memory means for storing predetermined data on relationships between times of acceleration and deceleration of said step motor, selector means for selecting between said data to determine an optimum deceleration time interval corresponding to the time of acceleration measured by said timer means and gate means for actuating said motor driving means in a second phase opposite to that of said first phase after the production of said timing signal for the optimum deceleration time period selected by said selector means.

26. The drive control system as claimed in claim 25, wherein said drive control circuit means reactuates said motor driving means in said first phase after the passage of said deceleration time period.

27. The drive control system as claimed in claim 26, wherein said timer means includes pulse generator means for producing clock signals and counter means for counting said clock signals from initial actuation of said motor driving means to production of said timing signal by said detector means to measure said time for acceleration.

* * * * *